United States Patent Office 3,433,751
Patented Mar. 18, 1969

3,433,751
POLYETHER POLYOL COMPOSITION AND POLY-URETHANE FOAMS PRODUCED THEREFROM
Masaru Yotsuzuka, Kobe, Akizo Keshi, Takatsuki, Norishige Hashimoto and Katsuhisa Kodama, Nishinomiya, and Shigenobu Nakahara, Suita, Japan, assignors to Takeda Chemical Industries, Ltd., Osaka, Japan
No Drawing. Filed Feb. 1, 1966, Ser. No. 523,950
Claims priority, application Japan, Feb. 1, 1965, 40/5,748
U.S. Cl. 260—2.5     10 Claims
Int. Cl. C08g 22/14; C07c 43/04

ABSTRACT OF THE DISCLOSURE

Flexible polyurethane foams especially useful for mattresses or carpets are prepared from polyether polyol mixture having an OH number between 40 and 70 which consists of a mixture glycol or triol polyether and a sucrose or sorbitol polyether.

---

This invention relates to a polyether polyol composition and to polyurethane foams produced from the composition.

Recently, polyurethane foams have gained a variety of application fields, but it is undeniable that there still remains room for improvement thereof in the use as, for example, mattresses. Flexible polyurethane foams used for mattresses are sometimes required to be of such properties as having a low compression set and a high indentation load.

The many attempts so far made for meeting this requirement have never resulted in satisfactorily imparting to flexible polyurethane foams the desired improvement without sacrificing other properties.

For example, according to hitherto-known methods, the production of a flexible polyurethane foam having a high indentation load is necessarily accompanied by increase in density of the foam, the increase being unfavorable from an economical viewpoint.

The present inventors had previously provided a flexible polyurethane foam having a low density, a high elongation and a higher indentation load than that of then known polyurethane foam.

Such a flexible polyurethane foam as above is useful for use in a mattress, etc., but it is not useful for the manufacture of a material (e.g. carpet) requiring a much higher indentation load but not requiring as high elongation as in a mattress, since its indentation load is not so high as to fully satisfy the objective.

According to the present invention, a polyether polyol composition having an OH number of 40 to 70, which consists of 15 to 75 equivalent percent of polyether glycol and/or -triol as the first component and 85 to 25 equivalent percent of polyether polyol prepared from sorbitol or sucrose as the second component, can be converted into flexible polyurethane foams having a low density as well as a much higher indentation load, sufficient to satisfy the objective though its elongation is a little lower, upon reacting with polyisocyanate compound, and additionally, the polyurethane foams thus produced, especially when sucrose is employed as an initiator, possess a high heat-resistance. (Hereinafter, the first component is simply referred to as "polyether glycol or triol" and the second one "polyether polyol.")

The present invention relates to a polyether polyol composition having an OH number of 40 to 70, preferably 40 to 60, useful as a starting material for making polyurethane foam, which consists of 15 to 75, preferably 55 to 65, equivalent percent of polyether glycol and/or triol component having an OH number of 20 to 200, preferably 30 to 100 and 25 to 85, preferably 35 to 45, equivalent percent of polyether polyol component having an OH number of 20 to 200, preferably 30 to 100, and to flexible polyurethane foams obtained by reacting the polyether polyol composition with polyisocyanate compound in the presence of a blowing agent.

The present polyether polyol composition can be converted, when allowed to react with polyisocyanate, to a flexible polyurethane foam having a high indentation load as well as a low density. Thus, the flexible polyurethane foam derived from the present polyether is useful for the manufacture of a material, for example carpets, requiring very high indentation load as well as a low density but not requiring as high elongation as in mattresses.

Moreover, the flexible polyurethane foam possesses a high heat-resistance, that is to say, its ignition temperature is higher than that of known flexible polyurethane foam by about 40 to 60° C. and it is not subjected to coloring even when treated at a high temperature. Therefore, such flexible polyurethane foam is very useful also for the production of a material to be used at a relatively high temperature.

In the composition of this invention, the amount of polyether polyol component used is selected from the range of 25 to 85, preferably 35 to 45, equivalent percent of the composition, so as to have the OH number of the resulting polyether polyol composition fall within the range of 40 to 70, preferably 40 to 60.

When a polyether polyol composition contains less than 25 equivalent percent of polyether polyol component or more than 85 equivalent percent, the composition can not be prepared into polyurethane foams having such desirable physical properties as mentioned above.

When using a polyether polyol composition having an OH number of less than 40, the foaming reaction proceeds too slowly and, moreover, the improvement in the indentation load of the polyurethane foam, which is the object of this invention, can not be accomplished.

On the other hand, when a polyether polyol composition having an OH number of more than 70 is used, the corresponding polyurethane foam obtained has a high compression set, and tends to shrink after the completion of the foaming reaction.

The polyether glycol and/or triol component used in this invention need not be extremely pure, but may contain up to 40 percent by weight of the polyether diol.

As the first component of this invention, polyether glycol or polyether triol may be employed, individually or in admixture. Selection from among the glycol, the triol and a mixture thereof, as well as ratios of the two components in the mixture, is determined in accordance with the purpose in view.

The polyether polyol composition of this invention may, for example, be prepared by blending one or more polyether triols and/or -glycols having an OH number of 20 to 200, preferably 30 to 100, and one or more polyether polyol components having an OH number of 20 to 200, preferably 30 to 100.

Said polyether triol, polyether glycol and polyether polyol components are obtained by addition polymerization of one or more alkylene oxides to one or more low molecular triols, one or both low molecular glycols and one or more of sorbitol and sucrose, respectively, in the presence or absence of a catalyst under alkaline or acid conditions in a per se known manner as described in, for example, "High Polymer, vol. XIII Polyethers, Part I" (1963) by Norman G. Gaylord published by Interscience Publishers, New York, N.Y.

As the high functional initiators there is employed sorbitol or sucrose. These are especially desired from an economical point of view, and the properties of the flexible polyurethane foams produced therefrom are fit for the purpose of this invention.

As the low molecular triol (i.e. tri-functional initiator), there are included, for example, glycerol, trimethylol propane, 1,2,6-hexanetriol, ethanolamines, 1,1,3-tris(p-hydroxyphenyl)propane, etc.

And, as the low molecular glycol (i.e., di-functional initiator), there are included, for example, ethylene glycol, diethylene glycol, bisphenol, propylene glycol dipropylene glycol, etc.

As the alkylene oxide, there are included, for example, ethylene oxide, propylene oxide, butylene oxide, styrene oxide, epichlorohydrin, etc., and a mixture of two or more of these may be used. Among them, the preferable ones are ethylene oxide, propylene oxide and a mixture thereof.

Among the polyether polyol components and the polyether triol components of this invention, the poly(oxyalkylene)polyols, the poly(oxyalkylene)glycols and the poly(oxyalkylene)triols whose poly(oxyalkylene) moiety are poly(oxypropylene), or ethylene oxide-propylene oxide copolymer are desirable.

That is, as the preferable polyether polyols of this invention, there are included, for example, poly(oxypropylene)sorbitol,
poly(oxypropylene)sucrose,
poly(oxypropylene-oxyethylene)sorbitol,
poly(oxypropylene-oxyethylene)sucrose;

as the preferable polyether triol, for example, poly(oxypropylene)glycerol,
poly(oxypropylene)trimethylolpropane,
poly(oxypropylene)hexanetriol,
poly(oxyethylene)glycerol,
poly(oxypropylene-oxyethylene)glycol,
poly(oxypropylene-oxyethylene)trimethylolpropane and
poly(oxypropylene-oxyethylene)hexanetriol;

and as the preferable polyether glycol, for example, poly(oxyethylene)glycol,
poly(oxypropylene)glycol and
poly(oxyethylene-oxypropylene)glycol.

The polyether polyol compositions of this invention may be prepared by an addition polymerization of alkylene oxide to a mixture of a low molecular triol (i.e. tri-functional initiator) and/or -glycol (i.e. di-functional initiator) and sucrose or sorbitol (i.e. high functional initiator), where the low molecular triol, -glycol, and the alkylene oxide have the same meaning as mentioned above in this specification.

The addition polymerization is carried out with or without a solvent in the presence of a basic catalyst such as an alkali hydroxide (e.g. sodium hydroxide, potassium hydroxide), and an alkali alcoholate (e.g. sodium methylate, potassium methylate), or an acidic catalyst (e.g. boron trifluoride), and a basic catalyst is usually preferable for the purpose. The polymerization proceeds under atmospheric pressure, but goes more rapidly under an elevated pressure not exceeding about 10 kilograms per square centimeter. The polymerization may be carried out at room temperature or at elevated temperature, preferably at a temperature between about 60° C. and about 170° C., particularly between about 80° C. and about 120° C. In the case of the use of an acidic catalyst, the polymerization is carried out desirably at a temperature somewhat lower than usual.

The ratio of the di- and/or tri-functional initiator to the high functional initiator and the amount of the alkylene oxide to be polymerized are selected so as to cause the resulting composition to have the desired OH number and also to have the desired ratio of polyether triol component to polyether polyol component.

All the alkylene oxide to be polymerized may be added at one step to the reaction system, but from the viewpoints of safety and the properties of the resulting composition, it is desirable to add the alkylene oxide to the reaction system as the addition polymerization proceeds.

Such a manner may be employed that after the addition polymerization of an alkylene oxide to a di- and/or tri-functional initiator proceeds to a certain degree, a high functional initiator is added to the reaction system to allow the further polymerization to take place. In this manner, it is permissible to add, first, a high functional initiator to allow the polymerization to take place, and then add the di- and/or tri-functional initiator.

The polyether polyol composition of this invention may be prepared by mixing a polyether triol and/or glycol with a reaction product which is obtained by addition polymerization of alkylene oxide to a mixture of small proportions of a di- and/or tri-functional initiator and large proportions of a high functional initiator.

In the production of polyether polyol component by means of addition polymerization of alkylene oxide to a solid high functional initiator alone which has usually a high melting point, a relatively long time, a particular solvent, e.g. dimethylsulfoxide or dimethylformamide, and a high pressure tend to be required as the essential conditions.

On the other hand, in the method of this invention, polyether polyol component can easily be prepared without such requirements as above, when a liquid initiator obtained by simply mixing a solid high functional initiator with a liquid di- and/or tri-functional initiator is employed.

From an industrial viewpoint, it is, therefore, profitable to prepare the polyether polyol composition of this invention by the use of so-called co-initiation method, that is, the method consisting of addition polymerization of an alkylene oxide to a mixture of a high functional initiator and a di- and/or tri-functional initiator.

Flexible polyurethane foams having improved physical properties can be prepared by the reaction of the polyether polyol composition of this invention with a polyisocyanate compound in the presence of a blowing agent.

As a polyisocyanate compound to be used for the purpose, there are included, for example, diisocyanates such as tolylene diisocyanate,
phenylene diisocyanate,
4,4'-diphenylmethane diisocyanate,
4,4'-diphenylethane diisocyanate,
4,4'-diphenyl diisocyanate,
4-chloro-m-phenylene diisocyanate,
1,6-hexane diisocyanate,
1,4-cyclohexane diisocyanate,
4,4'-methylene-di-(o-tolylisocyanate), triisocyanates such as 4,4',4''-triphenylmethane triisocyanate,
1-methoxy-2,4,6-benzene triisocyanate.

Among these, diisocyanates, especially tolylene diisocyanates are preferred.

As the blowing agents, there may be employed those per se known, for example, water, compounds capable of generating water during the reaction, halogenated hydrocarbons having low boiling point such as dichlorodifluoromethane, trichloromonofluoromethane or compounds generating nitrogen gas during the reaction such as azo compounds. The reaction is usually effected in the presence of a catalyst. The catalyst for the foaming reaction include, for example, tertiary amines (such as N-methylmorpholine, triethyl-amine, N,N,N',N' - tetrakis(2 - hydroxypropyl)ethylenediamine, triethylenediamine and the like) and organic tin compounds (such as dibutyltin dilaurate, dibutyltin di(2-ethylhexoate), stannous octoate and stannous 2-ethylhexoate, tetra-alkyl distannoxane derivatives).

For the production of the flexible polyurethane foams, the reactions may be carried out in the presence of, for example, a foam stabilizer (e.g. silicone oil—polydimethyl siloxane, alkylsilane-polyoxyalkylene copolymer—non-ionic surface active agents such as sorbitan monostearate, glycerol monooleate), pigments, additives, reinforcing materials, dyes, antioxidant, fireproofing agents, etc.

This reaction may be carried out after a per se known procedure as described, for example, in "High Polymers, vol. XVI, Polyurethanes: Chemistry and Technology I, Chemistry" by Sanders Frisch (1962) published by Interscience Publishers.

The flexible polyurethane foams thus obtained are of improved physical properties.

According to this invention, flexible polyurethane foams having much higher indentation load than that of per se known ones and a high heat-resistance as well as a low density, can be obtained without, substantially, deterioration of such other physical properties of the foam as compression set, tensile strength, tear strength, etc.

Flexible polyurethane foams of this invention are, therefore, useful for carpets.

The term "equivalent" used in this invention defines the number obtained by multiplying the mole number of a polyether by its functionality (i.e. the number of OH groups in one molecule), that is, defines the total numbers of OH groups in the polyether.

The equivalent percent of each polyether component in the polyether polyol composition obtained in this invention can be calculated from each amount of initiator used, and the OH number and amount of polyether polyol produced, under such commonly approved assumption that all the OH groups in the polyol compounds have the same reactivity to alkylene oxide.

The calculation is carried out by the following equations:

| | Amount used (g.) | Molecular weight | Functionality (number of OH groups per molecule) |
|---|---|---|---|
| Initiator A (functionality 3) | $a$ | $a'$ | $f_a$ |
| Initiator B (functionality 3) | $b$ | $b'$ | $f_b$ |
| | | Yield (g.) | OH number |
| Produced polyether polyol composition | | $W$ | $N_{OH}$ |

Equivalent of polyether polyol component of functionality $f_a$ in the product:

$$A' = \frac{a}{a'} \times f_a$$

Equivalent of polyether polyol component of functionality $f_b$ in the product:

$$B' = \frac{b}{b'} \times f_b$$

Equivalent of polyether diol in the product:

$$C = W \times \frac{N_{OH}}{56.1 \times 1000} - \left(\frac{a}{a'} \times f_a + \frac{b}{b'} \times f_b\right)$$

Equivalent percent of the components of functionality $f_a$:

$$E_A = \frac{A'}{A' + B' + C} \times 100$$

Equivalent percent of the component of functionality $f_b$:

$$E_B = \frac{B'}{A' + B' + C} \times 100$$

Equivalent percent of the component of functionality 2:

$$E_2 = \frac{C}{A' + B' + C} \times 100$$

Following are presently-preferred illustrative embodiments of the invention. Parts are by weight.

EXAMPLE 1

(a) Propylene oxide is added dropwise to a mixture of sucrose (253 parts), glycerol (76.7 parts) and potassium hydroxide (44.6 parts) under heating at 100° C. to 120° C. in a nitrogen gas stream to allow addition polymerization to take place, until the resulting reaction mixture has an OH number of about 56.

The reaction mixture is neutralized with hydrochloric acid to weak acidity, and precipitating solid potassium chloride is filtered off, followed by distilling off water and hydrochloric acid from thus obtained filtrate under heating at 100° C., by introducing dry nitrogen gas stream thereto, to obtain a polyether polyol composition (10,000 parts) having an OH number of 56.0, an unsaturation of 0.023 meq./g., an acidity of 0.005 mg. KOH/g., a viscosity (at 25° C.) of 820 cps., a water content of 0.01%, a sodium content of 0.7 p.p.m. and a potassium content of 1.5 p.p.m., and consisting of poly(oxypropylene) sucrose (59.2 equivalent percent), poly(oxypropylene)glycerol (25.0 equivalent percent) and poly(oxypropylene)glycol (15.8 equivalent percent).

The polyether polyol composition (300 parts) is mixed with poly(oxypropylene)glycerol having an OH number of 56.0 (e.g. Actol 31–56, Allied Chemical Corporation) (300 parts) to give a polyether polyol composition consisting of poly(oxypropylene)sucrose (29.6 equivalent percent), poly(oxypropylene)glycerol (57.5 equivalent percent) and poly(oxypropylene)glycol (12.9 equivalent percent).

(b)

Component 1: Parts
 The polyether polyol composition prepared
  above _____ 100
 Water _____ 4.0
 Silicone oil _____ 2.0
 2,4-triethylenediamine _____ 0.1

Component 2:
 Stannous octoate _____ 0.3

Component 3:
 Tolylene diisocyanate (a mixture of 80 parts
  of 2,4-isomer and 20 parts of 2,6-isomer) __ 49.6

By the use of a three component-type foaming machine having a delivery rate of 40 kilograms per minute, the above components 1, 2 and 3 are vigorously admixed to obtain flexible polyurethane foam.

As a control (1), flexible polyurethane foams are prepared by the same procedure as above except for the employment of 100 parts of poly(oxypropylene)glycerol having an OH number of 56 (e.g. Actol 31–56, Allied Chemical Corporation) in place of the polyether polyol composition.

EXAMPLE 2

(a) Propylene oxide is added dropwise to a mixture of sucrose (186 parts), trimethylol propane (180.9 parts) and potassium hydroxide (44.9 parts) under heating at 100° C. to 120° C. in a nitrogen gas stream to allow addition polymerization to take place, until the resulting reaction mixture has an OH number of about 56. The reaction mixture is treated after the manner described in Example 1(a) to obtain a polyether polyol composition (10,000 parts) having an OH number of 56.2, an unsaturation of 0.024 meq./g., an acidity of 0.005 mg. KOH/g., a viscosity (at 25° C.) of 730 cps., a water content of 0.01%, a sodium content of 0.8 p.p.m. and a potassium content of 1.6 p.p.m., and consisting of poly(oxypropylene)sucrose (43.5 equivalent percent), poly(oxypropylene)trimethylol propane (40 equivalent percent) and poly(oxypropylene)glycol (16 equivalent percent).

(b)

Component 1: Parts
  The polyether polyol composition prepared above _____ 100
  Water _____ 4.8
  Silicone oil _____ 2.5
  2,4-triethylene diamine _____ 0.1
Component 2:
  Stannous octoate _____ 0.3
Component 3:
  Tolylene diisocyanate (a mixture of 80 parts of 2,4-isomer and 20 parts of 2,6-isomer) ____ 57.8

With the use of the above three components, a flexible polyurethane foam is prepared after the manner described in Example 1(b). As a control (2), flexible polyurethane foams are prepared by the same procedure as above except for the employment of 100 parts of poly(oxypropylene)glycerol of OH number 56 in place of the polyether polyol composition.

EXAMPLE 3

(a) Propylene oxide is added dropwise to a mixture of Sorbitol (140 parts), glycerol (138 parts) and potassium hydroxide (42.1 parts) under heating at 100 to 120° C. in a nitrogen gas stream to allow addition polymerization to take place, until the resulting reaction mixture has an OH number of about 56. The reaction mixture is treated after the manner described in Example 1(a) to obtain polyether polyol composition (10,000 parts) having an OH number of 56.4, an unsaturation of 0.002 meq./g., an acidity of 0.004 mg. KOH/g., a viscosity (at 25° C.) of 580 cps., a water content of 0.01%, a sodium content of 0.8 p.p.m. and a potassium content of 1.6 p.p.m., and consisting of poly(oxypropylene)sorbitol (40 equivalent percent), poly(oxypropylene) glycerol (45 equivalent percent) and poly(oxypropylene) glycol (15 equivalent percent).

(b)

Component 1: Parts
  The polyether polyol composition prepared above _____ 100
  Water _____ 4.8
  Monofluorotrichloromethane _____ 7.0
  Silicone oil _____ 3.0
  Triethylene diamine _____ 0.1
Component 2:
  Stannous octoate _____ 0.4
Component 3:
  Tolylene diisocyanate (a mixture of 80 parts of 2,4-isomer and 20 parts of 2,6-isomer) ____ 57.8

With the use of these three components, a flexible polyurethane foam is prepared after the manner described in Example 1(a). As a control (3), a flexible polyurethane foam is prepared in the same manner as above except for employment of 100 parts of poly(oxypropylene)glycerol of an OH number of 56 in place of the above polyether polyol composition.

EXAMPLE 4

(a) Propylene oxide is added dropwise to a mixture of sucrose (253 parts), glycerol (76.7 parts) and potassium hydroxide (44.6 parts) under heating at 100 to 120° C. in a nitrogen gas stream to allow addition polymerization to take place, until the resulting reaction mixture has an OH number of about 56. The reaction mixture is treated after the manner described in Example 1(a) to obtain a polyether polyol composition (10,000 parts) having an OH number of 56.2, an acidity of 0.005 mg. KOH/g., an unsaturation of 0.025 meq./g., a viscosity (at 25° C.) of 820 cps., a water content of 0.01%, a sodium content of 0.8 p.p.m. and a potassium content of 1.5 p.p.m., and consisting of poly(oxypropylene)sucrose (59.2 equivalent percent), poly(oxypropylene)glycerol (25 equivalent percent) and poly(oxypropylene)glycol (15.8 equivalent percent).

(b)

Component 1: Parts
  The polyether polyol composition prepared above _____ 100
  Water _____ 4.8
  Triethylene diamine _____ 0.1
  Silicone oil _____ 2.5
Component 2:
  Stannous octoate _____ 0.3
Component 3:
  Tolylene diisocyanate (a mixture of 80 parts of 2,4-isomer and 20 parts of 2,6-isomer) ____ 57.8

With the use of these three components, a flexible polyurethane foam is prepared after the manner described in Example 1(b).

Some physical properties of the polyurethane foams obtained in the above examples are measured and the results are as follows:

TABLE 1

| Run | Component (equivalent percent) | | | Density, g./cm.³ | Tensile strength (kg./cm.²) | Elongation (percent) | I.L.D.[1] (kg./50 in.²) | | | Compression set percent, 50% 22 hrs. |
|---|---|---|---|---|---|---|---|---|---|---|
| | Polyol (functionality) | Triol | Diol | | | | 25% | 50% | 65% | |
| 1 | 29 (8) | 56 | 15 | 0.024 | 1.05 | 150 | 20.3 | 31.1 | 43.2 | 2.5 |
| Control (1) | | 100 | | 0.024 | 1.2 | 200 | 14.4 | 22.9 | 31.7 | 2.5 |
| 2 | 43.5 (8) | 40.5 | 16 | 0.021 | 1.0 | 150 | 20.4 | 29.3 | 40.5 | 1.7 |
| Control (2) | | 100 | | 0.021 | 1.3 | 200 | 16.4 | 24.8 | 33.5 | 2.2 |
| 3 | 40 (6) | 45 | 15 | 0.018 | 0.9 | 140 | 16.3 | 25.1 | 35.6 | 2.5 |
| Control (3) | | 100 | | 0.019 | 0.9 | 150 | 12.6 | 18.9 | 27.2 | 2.6 |
| 4 | 58 (8) | 25 | 17 | 0.0202 | 1.0 | 110 | 14.6 | 32.9 | 45.1 | 2.5 |

[1] I.L.D.—Identation Load Deflection.

The heat-resistance of the polyurethane foams of Example 2, control (2), Example 3, control (3), Example 4 and control (4) is measured. (Control (4) is a flexible polyurethane foam derived from a polyether polyol composition consisting of 90 equivalent percent of poly(oxypropylene)glycerol of molecular weight 3000 and 10 equivalent percent of poly(oxypropylene)sucrose of molecular weight 8000.)

The results are as follows:

TABLE 2

| Run | Ignition temperature,[1] °C. | Coloring after 22 hrs. treatment at 140° C |
|---|---|---|
| 2 | 430 | Colorless. |
| Control (2) | 350 | Yellow. |
| 3 | 450 | Colorless. |
| Control (3) | 350 | Yellow. |
| 4 | 450 | Colorless. |
| Control (4) | 390 | Yellow. |

[1] Ignition temperature is measured by heating the polyurethane foam at a rate of 25° C./min. while blowing air into the foam.

EXAMPLE 5

Propylene oxide is added dropwise to a mixture of sorbitol (46 parts), propylene glycol (115 parts) and potassium hydroxide (23 parts) under heating at 100 to 120° C. in a nitrogen gas stream to allow addition polymerization to take place, until the resulting mixture has an OH number of about 56.

The reaction mixture is treated after the manner described in Example 1(a) to obtain a polyether polyol composition (4640 parts) having an OH number of 56.0, an unsaturation of 0.087 meq./g., an acidity of 0.005 mg. KOH/g., potassium content of 1.8 p.p.m. and sodium content of 0.4 p.p.m., and consisting of poly(oxypropylene) sorbitol (32.2 equivalent percent) and poly(oxypropylene)glycol (67.8 equivalent percent).

EXAMPLE 6

Propylene oxide is added dropwise to a mixture of sucrose (64.5 parts), propylene glycol (115 parts) and potassium hydroxide (23 parts) under heating at 100° C. to 120° C. in a nitrogen gas stream to allow addition polymerization to take place, until the resulting reaction mixture has an OH number of about 56.

The reaction mixture is treated after the manner described in Example 1(a) to obtain a polyether polyol composition (4580 parts) having an OH number of 56.9, an unsaturation of 0.051 meq./g., an acidity of 0.03 mg. KOH/g., potassium content of 1.4 p.p.m. and sodium content of 1.0 p.p.m., and consisting of poly(oxypropylene) sucrose (32.8 equivalent percent) and poly(oxypropylene)glycol (6.72 equivalent percent).

EXAMPLE 7

(a) Propylene oxide is added dropwise to a mixture of sucrose (146 parts), glycerol (44.5 parts), water (2.5 parts) and potassium hydroxide (20 parts) under heating at 100 to 120° C. in a nitrogen gas stream to allow addition polymerization to take place, until the resulting mixture has an OH number of about 56.

The reaction mixture is treated after the manner described in Example 1(a) to obtain a polyether polyol composition (5050 parts) having an OH number of 56.7, an acidity of 0.02 mg. KOH/g., an unsaturation of 0.021 meq./g., potassium content of 2.6 p.p.m. and sodium content of 0.5 p.p.m, and consisting of poly(oxypropylene) sucrose (56.9 equivalent percent), poly(oxypropylene)glycerol (24.2 equivalent percent) and poly(oxypropylene) glycol (18.9 equivalent percent).

(b) Thus obtained polyether polyol composition (6400 parts) is mixed with poly(oxypropylene)glycerol (3600 parts) of OH number 56.0 (e.g. Actol 31–56, Allied Chemical Corporation) to give a polyether polyol composition consisting of poly(oxypropylene)sucrose (36.4 equivalent percent), poly(oxpyropylene)glycerol (15.5 equivalent percent) and poly(oxypropylene)glycol (48.1 equivalent percent).

EXAMPLE 8

(a) Propylene oxide is added dropwise to a mixture of 2,2-bis(4,4'-oxyphenyl)propane (512 parts) and potassium hydroxide (23 parts) under heating at 120 to 150° C. in a nitrogen gas stream to allow addition polymerization to take place, until the resulting mixture has an OH number of about 56.

The reaction mixture is treated after the manner described in Example 1(a) to obtain a polyether polyol component (4550 parts) having an OH number of 56.5, an acidity of 0.005 mg. KOH/g., an unsaturation of 0.019 meq./g., potassium content of 0.9 p.p.m and sodium content of 1.0 p.p.m.

(b) The polyether polyol obtained above (3600 parts) is mixed with the polyether polyol composition obtained in Example 7(a) (6400 parts) to give a polyether polyol composition consisting of poly(oxypropylene)sucrose (36.4 equivalent percent), poly(oxypropylene)glycerol (15.5 equivalent percent) and poly(oxypropylene)diol (48.1 equivalent percent).

The polyether polyol compositions obtained in Examples 5, 6, 7(b) and 8(b) are allowed to react with isocyanate compound under the following formulation after the manner described in Example 1(b) to obtain flexible polyurethane foam:

| | Parts |
|---|---|
| Polyether polyol composition | 100 |
| Tolylene diisocyanate (a mixture of 80 parts of 2,4-isomer and 20 parts of 2,6-isomer) | 49.6 |
| Water | 4.0 |
| Silicone oil | 2.0 |
| Stannous octoate | 0.4 |
| Triethylenediamine | 0.1 |

Thus obtained flexible polyurethane foam has the good physical properties and a high heat-resistance as observed in those of the previously described examples.

We claim:
1. A polyether polyol composition having an OH number of 40 to 60, which consists of 15 to 75 equivalent percent of polyether polyol having 2 to 3 OH groups per molecule and an OH number of 30 to 100 and 25 to 85 equivalent percent of polyether polyol prepared from sucrose or sorbitol and having an OH number of 30 to 100.

2. A polyether polyol composition having an OH number of 40 to 60, which consists of (A) 55 to 65 equivalent percent of a mixture of poly(oxyalkylene)triol and poly(oxyalkylene)diol of said mixture having an OH number of 30 to 100, the poly(oxyalkylene) moiety being a member selected from the group consisting of poly(oxypropylene) and ethylene-oxide-propylene oxide copolymer, and (B) 35 to 45 equivalent percent of poly(oxyalkylene) polyol prepared from sorbitol or sucrose and having an OH number of 30 to 100, the poly(oxyalkylene) moiety being a member selected from the group consisting of poly(oxypropylene) and ethylene oxide-propylene oxide copolymer.

3. A composition as claimed in claim 2, wherein the poly(oxyalkylene)triol is poly(oxypropylene)glycerol, and the poly(oxyalkylene)polyol is poly(oxypropylene) sucrose.

4. A composition as claimed in claim 2, wherein the poly(oxyalkylene)triol is poly(oxypropylene)glycerol, the poly(oxyalkylene)diol is poly(oxypropylene)glycol and the poly(oxyalkylene)polyol is poly(oxypropylene)sorbitol.

5. Flexible polyurethane foam obtained by reacting organic polyisocyanate with a polyether polyol composition having an OH number of 40 to 60 which consists of 15 to 75 equivalent percent of polyether polyol having 2 to 3 OH groups per molecule and having an OH number of 30 to 100 and 25 to 85 equivalent percent of polyether polyol prepared from sorbitol or sucrose and having an OH number of 30 to 100, in the presence of a blowing agent.

6. Flexible polyurethane foam as claimed in claim 5, wherein the polyether polyol having 2 to 3 OH groups per molecule is poly(oxypropylene)glycerol, and the polyether polyol is poly(oxypropylene)sorbitol.

7. Flexible polyurethane foam as claimed in claim 5, wherein the polyether polyol having 2 to 3 OH groups per molecule is poly(oxypropylene)glycerol, and the polyether polyol is poly(oxypropylene)sucrose.

8. Flexible polyurethane foam as claimed in claim 5, wherein the polyisocyanate is tolylene diisocyanate.

9. Flexible polyurethane foam as claimed in claim 5, wherein the polyisocyanate is tolylene diisocyanate, the polyether polyol having 2 to 3 OH group per molecule is poly(oxypropylene)glycerol, and the polyether polyol is poly(oxypropylene)sucrose.

10. Flexible polyurethane foam as claimed in claim 5, wherein the polyisocyanate is tolylene diisocyanate, the polyether polyol having 2 to 3 OH groups per molecule is poly(oxypropylene)glycerol and the polyether polyol is poly(oxypropylene)sorbitol.

References Cited

UNITED STATES PATENTS

| | | | |
|---|---|---|---|
| 3,042,631 | 7/1962 | Strandskov | 260—2.5 |
| 3,067,148 | 12/1962 | Sandridge et al. | 260—2.5 |
| 3,164,558 | 1/1965 | Eichhorn | 260—2.5 |
| 3,194,773 | 7/1965 | Hosetettler | 260—2.5 |
| 3,265,641 | 8/1966 | Wismer et al. | 260—2.5 |

FOREIGN PATENTS

| | | |
|---|---|---|
| 1,378,039 | 10/1964 | France. |
| 734,988 | 5/1966 | Canada. |

OTHER REFERENCES

Saunders and Frisch: Polyurethanes, 1964, Wiley, vol. II, pp. 212–6.

DONALD E. CZAJA, *Primary Examiner.*

M. B. FEIN, *Assistant Examiner.*

U.S. Cl. X.R.

252—182; 260—209, 615